Figure 1:
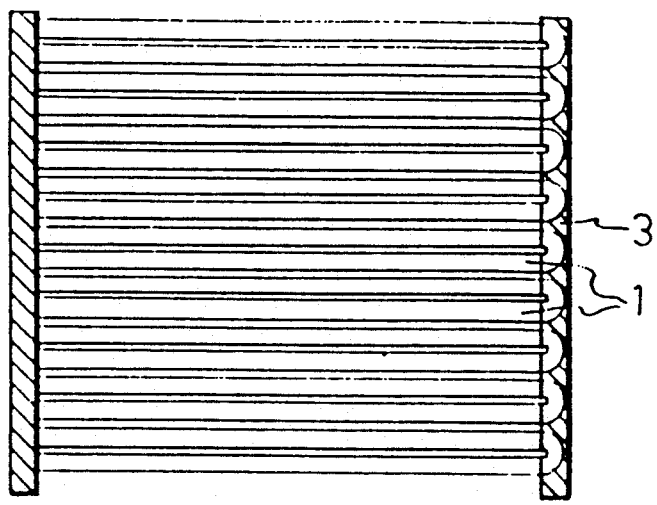

United States Patent [19]

Rothman et al.

[11] Patent Number: 5,094,738

[45] Date of Patent: Mar. 10, 1992

[54] METHOD FOR MAKING AN ELECTRODE

[75] Inventors: Ulf Rothman, Skanör, Sweden; Jesper Malling, Odense, Denmark

[73] Assignee: Inclusion AB, Sweden

[21] Appl. No.: 598,728

[22] PCT Filed: Apr. 19, 1989

[86] PCT No.: PCT/SE89/00215

§ 371 Date: Oct. 24, 1990

§ 102(e) Date: Oct. 24, 1990

[87] PCT Pub. No.: WO89/10635

PCT Pub. Date: Nov. 2, 1989

[30] Foreign Application Priority Data

Apr. 19, 1988 [SE] Sweden .................... 880159-2

[51] Int. Cl.$^5$ .................................. C25C 1/24
[52] U.S. Cl. ................................ 204/123; 204/140
[58] Field of Search ...................... 204/123, 140

[56] References Cited

U.S. PATENT DOCUMENTS 4,056,885 11/1977 Rao ............................. 29/623.1
4,690,840 9/1987 Gauthier ....................... 427/436

Primary Examiner—T. M. Tufariello
Attorney, Agent, or Firm—Laurence R. Brown

[57] ABSTRACT

A method of producing an anode unit, whose active material consists of an alloy of an alkaline metal and a host metal therefore. An elongated element of the host metal is enclosed in a separator in form of a hollow fibers and is put in electrochemical contact with an organic solution of the alkaline metal, which migrates through the hollow fiber wall for alloying the host metal element. In a preferred embodiment strips are punched out at distances from each other in a sheet of the host metal and films of hollow fibers materials, laid on the two surfaces of the sheet, are welded together in the openings left after the punching for forming hollow fibers.

4 Claims, 2 Drawing Sheets

METHOD FOR MAKING AN ELECTRODE

Rechargeable cells/batteries with an anode of Li/Al receive increasing attention due to the facts among other things that they have high energy density and power density, work over a great temperature bracket, including room temperature, and have good storage capability.

Reference is in this context made to the publications U.S. Pat. No. 4,690,840 and 4,056,885.

In U.S. Pat. No. 4,690,840 description is made of the production of an Li/Al anode in that a metallic Al-body is immersed into a free radical solution, comprising Li-salt solved in an organic solvent. After a certain immersion time an Li/Al alloy is obtained which depending on the shape of the metallic body can form or be formed into an anode.

In U.S. Pat. No. 4,056,885 description is also made of the production of an Li/Al anode in sheet form in that a laminate of Li and Al is immersed into an anhydrous organic solvent with lithium salt therein.

These publications are incorporated into this specification by means of reference, especially as regards chemical reactions, electrolytes, anode and cathode materials, and separator materials.

The main problem behind the present invention is to accomplish a method by which it is possible to produce in a simple and rational way an anode of an alloy of an alkaline metal or alkaline earth metal and a host metal therefore, where the anode has a larger contact area than is possible to attain by the techniques according to the above mentioned pulications. A larger contact area gives a larger power/energy density.

For the sake of simplicity and for the reason that at present Li/Al is considered to be the most usable anode material in anodes of an alkaline metal or an alkaline earth metal and a host metal, the combination of the metals is below called Li/Al. As an alternative to Al special mention of Sn is made.

Behind the invention are also the problems that the separator in a cell with Li/Al anode, which is brittle and easliy falls apart, is exposed to pressure variations at charge/discharge, which means that the separator is stressed, and that the arrangement of the separator in a cell between the anode and cathode, for example according to the above mentioned publications, involves an additional and thus costly step.

According to the invention, as defined in the claims, an Li/Al anode unit is accomplished in situ in a flexible enclosure in the form of an at least somewhat elastic, micro-porous hollow fiber of plastic material, which is suitable for forming a separator relative to a cathode in a cell/battery. The enclosure constitutes a mold for establishing the Li/Al anode unit as well as a separator between this unit and the cathode in the cell/battery. Due to its flexibility and elastic character the enclosure/separator can adapt to the volume changes occurring when the anode unit is produced and when it is used as an electrode in a cell, so that the anode is prevented from falling apart. In a battery the anode is formed of one or more or a plurality of such anode units electrically connected to each other.

The basic Al element can contain a core of another metal which does not form an alloy with Li, for example Cu; this core constitutes the current collector in the anode.

Suitable separator materials or raw materials and techniques for producing separator materials with the above specified character are already on the market. A suitable separator material is polypropylene, which is solid by Celanese Corporation under the trademark Celgard ®. The Pore size should be in the bracket 0.01-100 mm, preferably 0.1-20 mm, inner diameter 0.005-10 mm, preferably 0.05-3 mm - with corresponding outer cross sectional dimension for the basic Al element -, a thickness in the bracket 0.005-5 mm and a porosity of >10%. The electrochemical contact is preferably accomplished by short-circuiting and electrochemical cell with Al as electrode and Li as counter electrode. It is, however, also possible to choose to apply a voltage on one of those electrodes.

Figure 2:
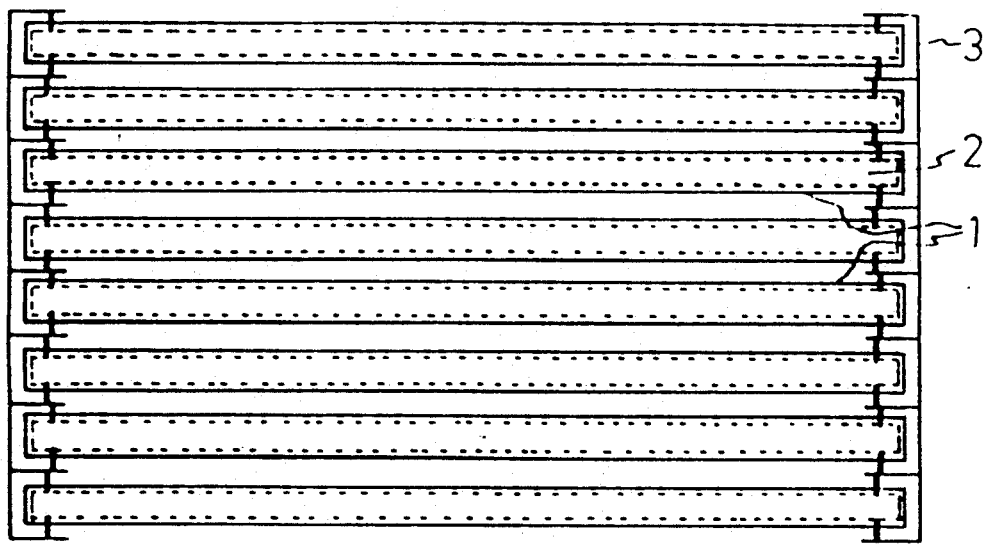
Figure 3:
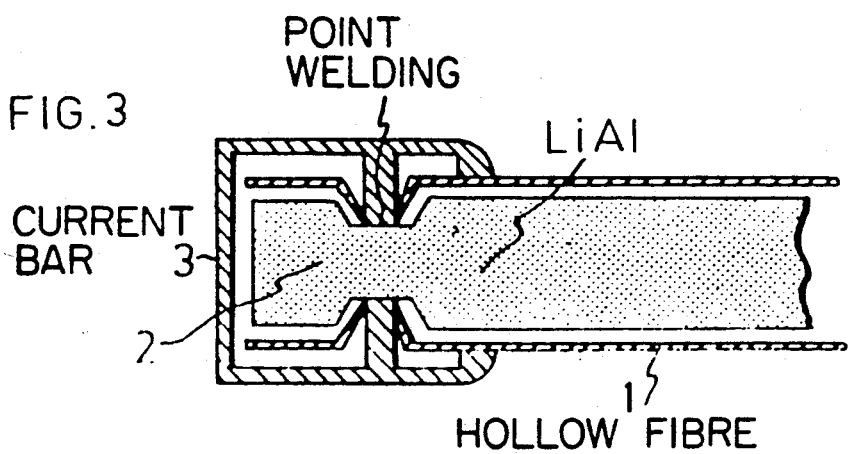
Figure 4:
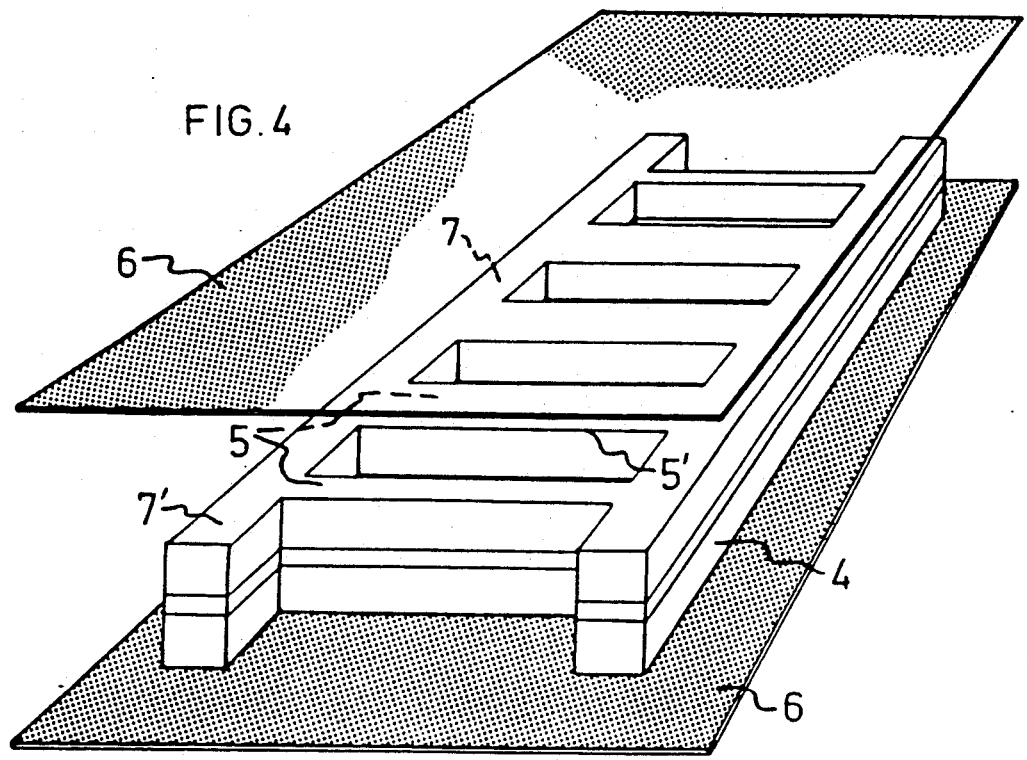
Figure 5:
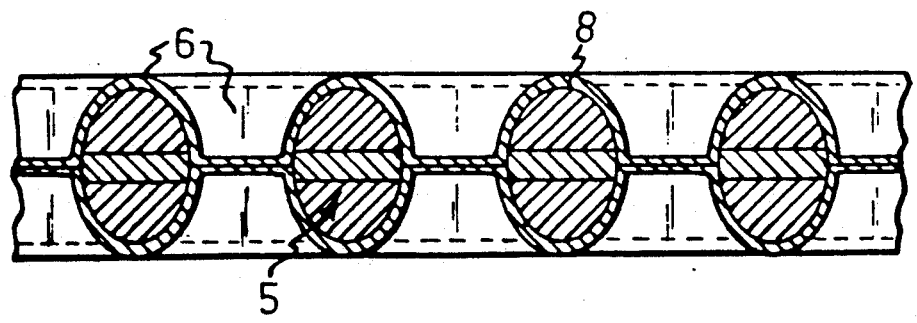

Two embodiments of the invention will now be further described under reference to the accompanying drawings, in which FIGS. 1-3 illustrate the first embodiment and
FIGS. 4-5 the second one, both in the form of an aggregate of several anode units.
FIG. 1 is a side view,
FIG. 2 is a cross sectional view,
FIG. 3 an enlarged partial view,
FIG. 4 an exploded view and
FIG. 5 a sectional view.

The starting point for the method according to the first embodiment is a hollow fiber containing an Al thread. Such a combination can be produced by extruding the separator material, for example polypropylene, on the Al thread with technique known from the manufacture of electrical cables and hollow fibers. The Al thread in the combination is brought into electrochemical contact with an anhydrous solution containing lithium and having a composition for example according to U.S Pat. No. 4,690,840, so that the Al thread is alloyed with lithium. The combination forms the electrode in a short-circuited electrochemical cell with an Li counter electrode and with for example THF-LiCF$_3$SO$_3$ as electrolyte. The alloy extent of Al with Li is controlled for example by means of the time during which the cell is allowed to operate short-circuited.

It is realized that in this way anode units with optional shape (straight, spiral, helix, and so forth) can be accomplished and also simultaneously an aggregate of a plurality (for example tens of thousands) of anode units.

Now, an advantageous, flat, grid-like aggregate of anode units will be described under reference to FIGS, 1-3.

A combination of a thermoplastic hollow fiber 1 and an Al thread 2 therein is drawn in S-windings between two metal bars 3 (current bars), to which the Al thread is attached with electrical contact. This is accomplished in that the hollow fiber portion in the S-bends is evaporated by means of high frequency alternating current or ultrasound and the thus uncovered S-bends of the Al thread is spot welded to the bars 3. This type of removal of the hollow fiber enclosure has the added advantage that also possible coatings (oxide) on the Al thread 2 are removed, so that the following spot welding to the bar occurs with good electrical contact. The current bar is externally coated with some insulating lacquer.

In this way optionally long aggregates of current bars/combinations of hollow fiber and Al thread can be produced. The technique also permits combinations of hollow fiber-Al thread to be placed optionally close to each other on the current bars.

The above described process with electrochemical contact for production of an aggregate of Al-Li anode units can follow thereafter. Several accordingly produced flat aggregates can be stacked on top of each other, with interlays of cathode material, for example coal powder, and following filling the pores of the separator with electrolyte, in order to form an anode package for a battery.

In the embodiment according to FIGS. 4 and 5 the starting point for the production of anode units is a sheet 4 of laminate or sandwich construction of Al-Cu-Al foils in electrical conductive connection with each other. In the sheet 4 strips are cut out (punched out) at mutually parallel distances, so that a grid-like configuration is obtained. The longitudinal edges 5' of the grid bars 5, which have a square cross-section, are then rounded, for example by means of a punch tool. This rounding step can coincide with the first-mentioned punching step. On the main surfaces of the grid configuration a micro-porous thermoplastic separator film 6 with greater dimensions (width, length) than those of the configuration is applied, so that the edge portions of the films 6 can get in contact with each other at all sides of the configuration and the films 6 can get in contact with each other in the spaces created by the punching. These contacts (surface or line) should be such that the films 6 meet each other in the central plane of the configuration with reasonably tight fit around the configuration and the grid bars. The film contact surfaces are then welded together, for example with line welding, as well as the contact surfaces between the films 6 and the longitudinal edge portions 7, around these between the grid bars with surface welding. The result is illustrated in FIG. 5. After this step a number of hollow fibers 8 has thus been created, formed by the welding operation on the films 6, each enclosing an Al-Cu-Al rod. These rods are electrically conductive connected with each other by means of longitudinal edge portions 7 of the configuration; in these areas all sides are welded together with the films, so that the film pores there are closed. The edge portions 7 can—as may be understood—from current bars with pole shoes 7' extending through the above described film "bag". The insulation of the current bars 7 can be accomplished in other ways, for example lacquering, immersion in rubber solution. Break-throughs can possibly be made in the welded-together film area between the grid bars/electrode units.

The technique for transforming the sandwich bars 5 inside the hollow fibers 8 formed by the welding together of the films 6 to Al/Li allowy is performed as has been described above in that these bars 5 are short-circuited via the current bars 7, 7' with an Li counter electrode in an organic electrolyte containing Li.

We claim:

1. A method of producing an aggregate of anode units, whose active material consists of an alloy of an alkaline metal or an alkaline earth metal and a host metal therefore, whereby elongate elements of the host metal are enclosed in hollow fibers of a microporous, flexible and at least somewhat elastic plastic material suitable as electrode separator, the hollow fibers having essentially the same cross-sectional dimension as the host metal elements, whereupon the latter are placed in electrochemical contact with an organic solution of the alkaline metal or the alkaline earth metal which by electrochemical reaction causes migration of the alkaline metal or the alkaline earth metal through the hollow fiber wall for alloying the host metal element, characterized in that the elongate elements of host metal are arranged in a grid-like configuration, so that they form the grid-bars enclosed in hollow fibers, while the longitudinal bars are of an electrically conductive material so as to form current bars, and in that the electrochemical contact is accomplished by conducting away current from the current bars.

2. A method according to claim 1, whereby for said enclosure a host metal thread is provided with a hollow fiber envelope extruded thereon, characterized in that the host metal element in the hollow fiber is attached to the current bars in that the combination of hollow fiber and host metal element enclosed therein is laid in S-windings between two current bars, that the hollow fiber portion at the S-bends is melted/evaporated away and that the thus uncovered S-bends of the host metal are spot welded on the bars.

3. A method according claim 1, characterized in that strips are punched out at distances from each other in a sheet of the host metal, that a film of hollow fiber material is laid on the two surfaces of the sheet, that the films are welded together in the openings left after the punching operation, that edge portions of the sheet are insulated, and that these edge portions form the current bars.

4. A blank for carrying out the method according to claim 3, in which aggregate of anode units is produced, whose active material consists of an alloy of an alkaline metal or alkaline earth metal and a host metal therefore, characterized in that it has a grid-like configuration, where the grid bars are formed by a combination of hollow fiber with host metal element enclosed thereby and at their ends are connected to each other in an electrically conductive way.

* * * * *